(12) United States Patent
Loung et al.

(10) Patent No.: US 10,778,320 B2
(45) Date of Patent: Sep. 15, 2020

(54) METHOD AND RELAY FOR COMMUNICATING A VALUE OF A PARAMETER OF A SOURCE TO BE MONITORED

(71) Applicant: Schneider Electric Industries SAS, Rueil Malmaison (FR)

(72) Inventors: Liew Yew Loung, Singapore (SG); Yong Heng Han, Singapore (SG); Chong Pat Jong, Singapore (SG)

(73) Assignee: SCHNEIDER ELECTRIC LOGISTICS ASIA PTE LTD., Singapore (SG)

( * ) Notice: Subject to any disclaimer, the term of this patent is extended or adjusted under 35 U.S.C. 154(b) by 0 days.

(21) Appl. No.: 13/656,236

(22) Filed: Oct. 19, 2012

(65) Prior Publication Data
US 2013/0260673 A1   Oct. 3, 2013

(30) Foreign Application Priority Data

Oct. 21, 2011   (SG) ................................ 201107779-9

(51) Int. Cl.
*H04B 7/14* (2006.01)
*H01H 71/00* (2006.01)

(52) U.S. Cl.
CPC ............... *H04B 7/14* (2013.01); *H01H 71/00* (2013.01); *H01H 2071/006* (2013.01)

(58) Field of Classification Search
CPC .... H04B 7/14; H01H 71/00; H01H 2071/006; H01H 2071/044
USPC ............... 455/7, 9, 13.1, 66.1, 67.11, 67.16; 361/88–91.3, 92, 94
See application file for complete search history.

(56) References Cited

U.S. PATENT DOCUMENTS

| | | | |
|---|---|---|---|
| 5,224,011 A | | 6/1993 | Yalla et al. |
| 5,319,514 A | * | 6/1994 | Walsh et al. ..................... 361/59 |
| 5,579,197 A | * | 11/1996 | Mengelt et al. ............. 361/93.4 |
| 5,737,168 A | * | 4/1998 | Baker ............................. 361/90 |
| 6,167,329 A | | 12/2000 | Engel et al. |
| 8,691,454 B1 | * | 4/2014 | Czajkowski et al. ......... 429/428 |
| 2002/0006045 A1 | * | 1/2002 | Shirai et al. .................... 363/17 |
| 2002/0122319 A1 | * | 9/2002 | Mobers et al. ............. 363/21.01 |
| 2005/0243491 A1 | * | 11/2005 | Tanis ............................ 361/104 |

(Continued)

FOREIGN PATENT DOCUMENTS

| | | |
|---|---|---|
| EP | 0949734 A2 | 10/1999 |
| EP | 2 352 257 | 8/2011 |
| GB | 2476448 A | 6/2011 |

OTHER PUBLICATIONS

Extended European Search Report Communication dated Jan. 23, 2013, including European Search Report dated Jan. 15, 2013 and European Search Opinion, in counterpart EP Application No. EP12189418, (5 pages).

(Continued)

*Primary Examiner* — Ankur Jain
(74) *Attorney, Agent, or Firm* — David V. Rossi; Haug Partners LLP (57) ABSTRACT

A method and relay for communicating a value of a parameter of a source to be monitored. The relay comprises an input sampling module for coupling to the source to be monitored, the sampling module configured to detect the value of a parameter of the source to be monitored; and an output module for communicating the value to a user.

24 Claims, 8 Drawing Sheets

(56) References Cited

U.S. PATENT DOCUMENTS

| | | | |
|---|---|---|---|
| 2006/0052958 A1* | 3/2006 | Hancock et al. | 702/60 |
| 2007/0014176 A1* | 1/2007 | Krenzke et al. | 365/226 |
| 2008/0071482 A1* | 3/2008 | Zweigle et al. | 702/62 |
| 2009/0086396 A1* | 4/2009 | Bax et al. | 361/93.6 |
| 2010/0109612 A1* | 5/2010 | Nguyen | 320/136 |
| 2010/0271006 A1* | 10/2010 | Fortner | 324/126 |
| 2011/0063768 A1* | 3/2011 | Sexton et al. | 361/79 |
| 2011/0184578 A1* | 7/2011 | Elwell et al. | 700/295 |
| 2011/0251807 A1* | 10/2011 | Rada et al. | 702/61 |
| 2012/0212872 A1* | 8/2012 | Padmanabh et al. | 361/93.6 |
| 2012/0221161 A1* | 8/2012 | Billingsley | G01R 19/16547 700/295 |
| 2013/0051789 A1* | 2/2013 | Shih | 398/16 |

OTHER PUBLICATIONS

Search Report (7 pages) dated Mar. 3, 2014 by serv.ip in counterpart priority Singapore application No. 201107779-9.
Written Opinion (7 pages) dated Mar. 3, 2014 by serv.ip in counterpart priority Singapore application No. 201107779-9.

* cited by examiner

METHOD AND RELAY FOR COMMUNICATING A VALUE OF A PARAMETER OF A SOURCE TO BE MONITORED

CROSS-REFERENCE TO RELATED APPLICATIONS

This application is based upon and claims the benefit of priority from the corresponding Singapore Patent Application No. 201107779-9, filed Oct. 21, 2011, which is incorporated herein by reference in its entirety.

TECHNICAL FIELD

The present disclosure relates broadly to a method and relay for communicating a value of a parameter of a source to be monitored.

BACKGROUND

In the electronics industry, devices comprising relays are typically used to operate machinery and circuits. Such devices typically rely on energisation or switching on/off for operations.

In some of such devices, users may be able to set parameters to be monitored by the relay. For example, when the device is connected to a three phase power source, the parameters monitored may include nominal operating voltage range, over voltage limit, under voltage limit, time delay, phase asymmetry threshold etc. The parameters are calculated from a desired working/operating condition which the user also manually programs into the relay. For example, if a user sets the working condition of a power supply as 240 V, an overvoltage tolerance of 5%, that has also been set, causes the relay to calculate an overvoltage limit of 252 V such that the relay switches on/off when the monitored voltage level meets the calculated limit. As a further example, if a user sets a voltage range to 400 V, an under-voltage limit to 300 V, an over-voltage limit to 440 V, an asymmetry limit to 30 V and a time-setting to 5 seconds, this would instruct the relay to monitor a physical input parameter of a source on whether the parameter is less than 300 V or more than 440 V, or the difference of voltage between 3-phase leads is more than 30 V. If any condition is met, the relay de-energizes after delaying for a time-delay of 5 seconds.

However, in the above example, one problem that typically arises is that when the relay de-energizes, the user is only aware that at least one of the conditions is met but is typically unable to tell exactly which condition(s) is met. For instance, the user is not able to differentiate between a phase loss fault, a phase sequence fault, a phase under-voltage fault, phase-overvoltage fault or phase asymmetry fault.

The lack of knowledge on the exact causes of such a device switching off can make diagnosis difficult and costly. As the trial and error approach may typically be used to diagnose problems, the entire diagnosis session may be extremely time consuming. Also without having real-time information of a source (for e.g. a power source), a trip cannot be accurately pre-empted or prevented. Accordingly, as the trip may occur any time without providing any fore-warning signs, this may lead to unnecessary downtime for the equipment controlled by the relay, which may in turn lead to an undesirable drop in productivity.

Currently, the inventors have recognised that there is no suitable device or method which can provide information on the exact causes of a trip or real time information on the different characteristics of an input source e.g. a power source to pre-empt any potential aberrations in the input source. This may be due to a lack of an efficient method or mechanism for detecting the characteristics of an input source and communicating such information.

Hence, in view of the above, there exists a need for a method and device for communicating information relating to an input source that seek to address or ameliorate at least one of the above problems.

SUMMARY

According to one aspect of some embodiments as set forth in the present disclosure, there is provided a relay for communicating a value of a parameter of a source to be monitored, the relay comprising an input sampling module for coupling to the source to be monitored, the sampling module configured to detect the value of a parameter of the source to be monitored; and an output module for communicating the value to a user. The relay may further comprise a processing module configured to monitor a working range, wherein the processing module is capable of instructing a trigger module for transmitting a trigger signal from the relay if the value of the parameter is outside the working range. The relay may further comprise a storage module coupled to the processing module for storing the detected value. The relay may further comprise a trigger module coupled to the processing module for controlling a switch element based on the trigger signal.

In one embodiment, the input sampling module detects a plurality of values. The switch element may be at least one of an electromechanical relay switch or a solid state relay switch. The parameter may be selected from a group consisting of three phase voltage, single phase voltage, single phase current, phase angle, phase frequency, power, temperature, resistance and digital signals.

The output module is capable of communicating a plurality of values to a user. The relay may further comprise an output port coupled to the output module for facilitating the communication of said value. The output port may be configured to receive a compatible plug in. The outlet port may be selected from the group consisting of a Universal Serial Bus (USB) port, a Registered Jack 45 (RJ45) port, an IEEE 1384 port, a serial port, a parallel port, a Personal Computer Memory Card International Association (PCM-CIA) port, an Inter-Integrated Circuit ($I^{2C}$) port, a Small Computer System Interface (SCSI) port, an optical port, a coaxial port, a Registered Jack 11 (RJ11) port, a RS232 port, a RS485 port, and a RS442 port. The output module may comprise a wireless transceiver. The wireless transmitter may be selected from the group consisting of a Bluetooth transceiver, a WIFI transceiver, a Zigbee transceiver, a Radio Frequency (RF) transceiver, a Bluetooth transceiver, infra-red transceiver. The wireless transceiver may use a wireless protocol selected from the group consisting of Bluetooth, Zigbee and WLAN protocol. The output module may comprise a display capable of communicating the value directly to the user.

According to another aspect of some embodiments as set forth in the present disclosure, there is provided a method of communicating, from a relay, a value of a parameter of a source to be monitored, the method comprising detecting the value of a parameter of the source to be monitored by a sampling module of the relay; and communicating the value to a user from an output module of the relay. The method may further comprise monitoring a working range; and transmitting a trigger signal from the relay if the value of the parameter is outside the working range. The method may further comprise storing the value in a storage module of the relay. The method may further comprise controlling a switch element of the relay based on the trigger signal. The step of detecting may comprise detecting a plurality of values. The switch element may be at least one of an electromechanical relay switch or a solid state relay switch. The parameter may be selected from a group consisting of three phase voltage, single phase voltage, single phase current, phase angle, phase frequency, power, temperature, resistance and digital signals.

The communicating step may communicate a plurality of values to a user. The step of communicating the value may comprise connecting a receiving means to the output module using at least one of a Universal Serial Bus (USB) cable, a Registered Jack 45 (RJ45) cable, an IEEE 1384 cable, a serial cable, a parallel cable, a Personal Computer Memory Card International Association (PCMCIA) cable, an Inter-Integrated Circuit ($I^{2C}$) cable, a Small Computer System Interface (SCSI) cable, an optical cable, a coaxial cable, a Registered Jack 11 (RJ11) cable, a RS232 cable, a RS485 cable, and a RS442 cable. The step of communicating the value may comprise connecting a receiving means to the output module using a wireless protocol. The wireless protocol may be selected from the group consisting of Bluetooth, Zigbee and WLAN protocol. The receiving means may comprise at least one of a computer or mobile phone.

According to another aspect of some embodiments as set forth in the present disclosure, there is provided a notification system for a relay, the system comprising a relay, the relay comprising an input sampling module for coupling to a source to be monitored, the sampling module configured to detect a value of a parameter of the source to be monitored; and an output module for communicating the value to a user; and a notification device for coupling to the output module of the relay to receive the value, wherein the notification device is configured to alert the user. The notification device may comprise a programmable logic controller.

According to another aspect of some embodiments as set forth in the present disclosure, there is provided a computer readable data storage medium having stored thereon computer code means for instructing a processing module of a relay to execute a method for communicating, from a relay, a value of a parameter of a source to be monitored, the method comprising detecting the value of a parameter of the source to be monitored by a sampling module of the relay; and communicating the value to a user from an output module of the relay. The method may further comprise monitoring a working range; and transmitting a trigger signal from the relay if the value of the parameter is outside the working range.

It is understood that the foregoing summary is representative of some embodiments of the present disclosure, and is neither representative nor inclusive of all subject matter and embodiments within the scope of the present disclosure. It is further understood that in the foregoing summary references to various features being preferable and/or being comparatively preferable (e.g., more preferably, even more preferably, etc.) are applicable to various embodiments or implementations and do not imply that such preferences and/or comparative preferences are applicable to all embodiments, and thus should not be limiting or restrictive of the present invention as claimed. Additionally, it will be appreciated by those skilled in the art that the foregoing brief description and the following detailed description are exemplary and explanatory of some embodiments of the present disclosure, but are not intended to be restrictive of the present disclosure or limiting of the advantages which it can achieve in various implementations.

BRIEF DESCRIPTION OF THE DRAWINGS

Example embodiments of the invention will be better understood and readily apparent to one of ordinary skill in the art from the following written description, by way of example only, and in conjunction with the drawings, in which.

DETAILED DESCRIPTION

Example embodiments described below can provide a relay, method and system for communicating a value of a parameter of a source to be monitored.

In example embodiments, a relay can be provided to detect a parameter value of a source to be monitored and to communicate the detected value to a user. The relay can access pre-set or user-set one or more threshold levels and apply the threshold levels to a manually or automatically set working condition to obtain a working range. The relay monitors parameter values of the source to be monitored against the working range and if the value is outside the working range, a trigger signal is transmitted.

In one example embodiment, the trigger signal comprises energising or de-energising (e.g. switching on or switching off) a switch element of the relay. In one example embodiment, a user can set working conditions or working ranges based on settings of a voltage range, pre-set over-voltage limit, under-voltage limit, asymmetry limit and time setting. After the working conditions or working ranges are set, the relay can monitor the parameter values.

In one example embodiment, the relay is equipped with communication features, for instance using a Zigbee communication protocol and is able to communicate instantaneous physical input parameter to a user via a programmable logic controller and a mobile phone. The information that can be communicated to the user can include instantaneous 3 phase voltage value (can be represented graphically and/or numerically to the user), and the types of fault that has occurred (i.e. which results in the tripping of the relay). Such faults can include, phase loss, phase sequence aberrations, phase asymmetry, under-voltage or over-voltage etc. The communication capabilities between the relay may be implemented by the presence of an output module.

In the description herein, a relay can be an energisable element that can include, but is not limited to, any device that can be switched/powered on and off such as a coil of an electrical relay. The element can also include other electromechanical switching devices, components or parts. The relay can also be a solid state relay.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of a instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Figure 1A:
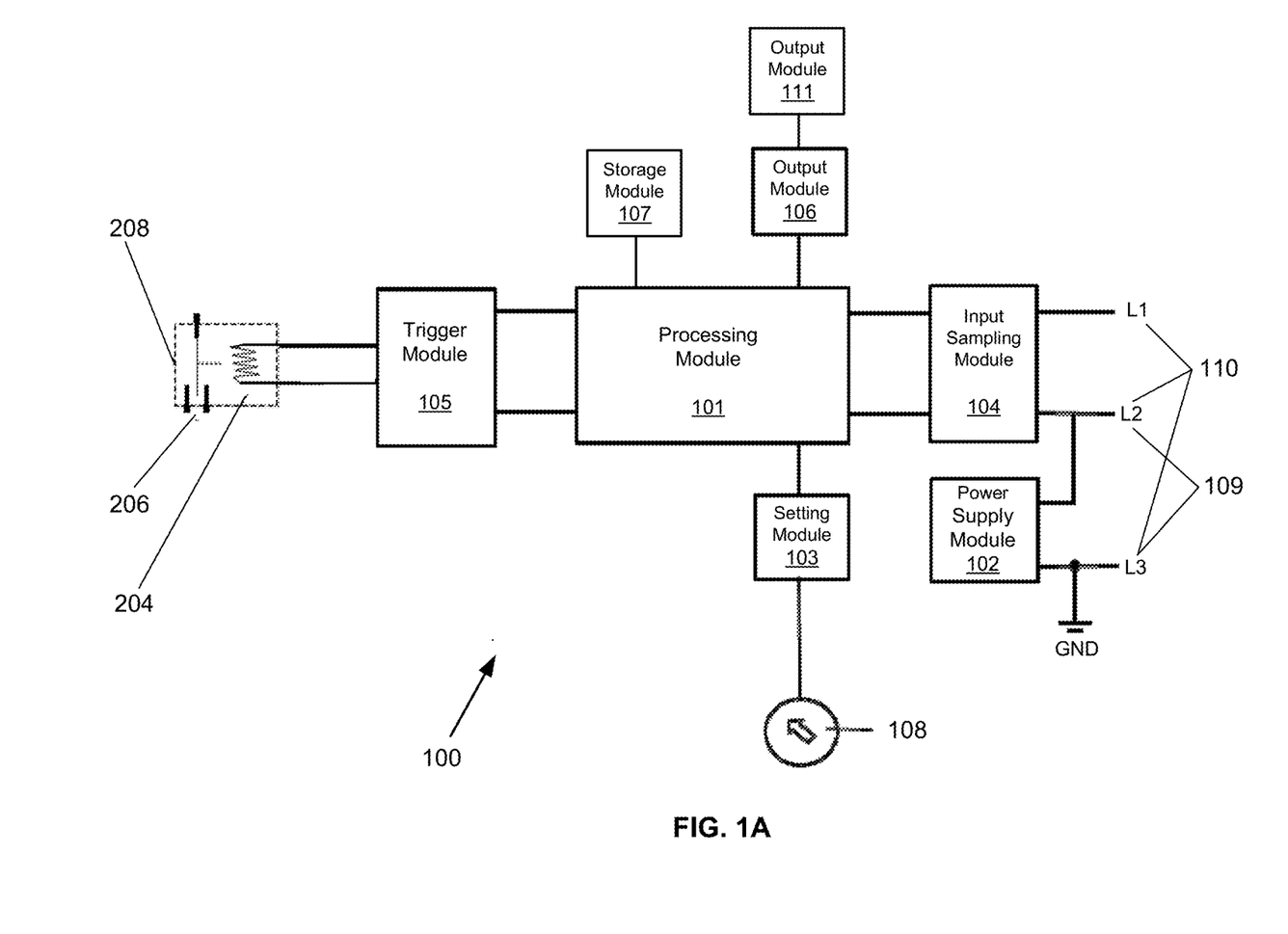
FIG. 1(a) shows a schematic diagram illustrating a relay in an example embodiment.

FIG. 1(*a*) shows a schematic diagram illustrating a relay in an example embodiment. In the example embodiment, the relay is used as a control relay 100. The relay 100 is configured to be coupled to a source to be monitored such as a three-phase power supply line voltage source 110. The relay 100 can detect values of one or more parameters of the source to be monitored. The relay 100 can also communicate the detected values of one or more parameters of the source to be monitored to a user via an output module 106.

Figure 1B:
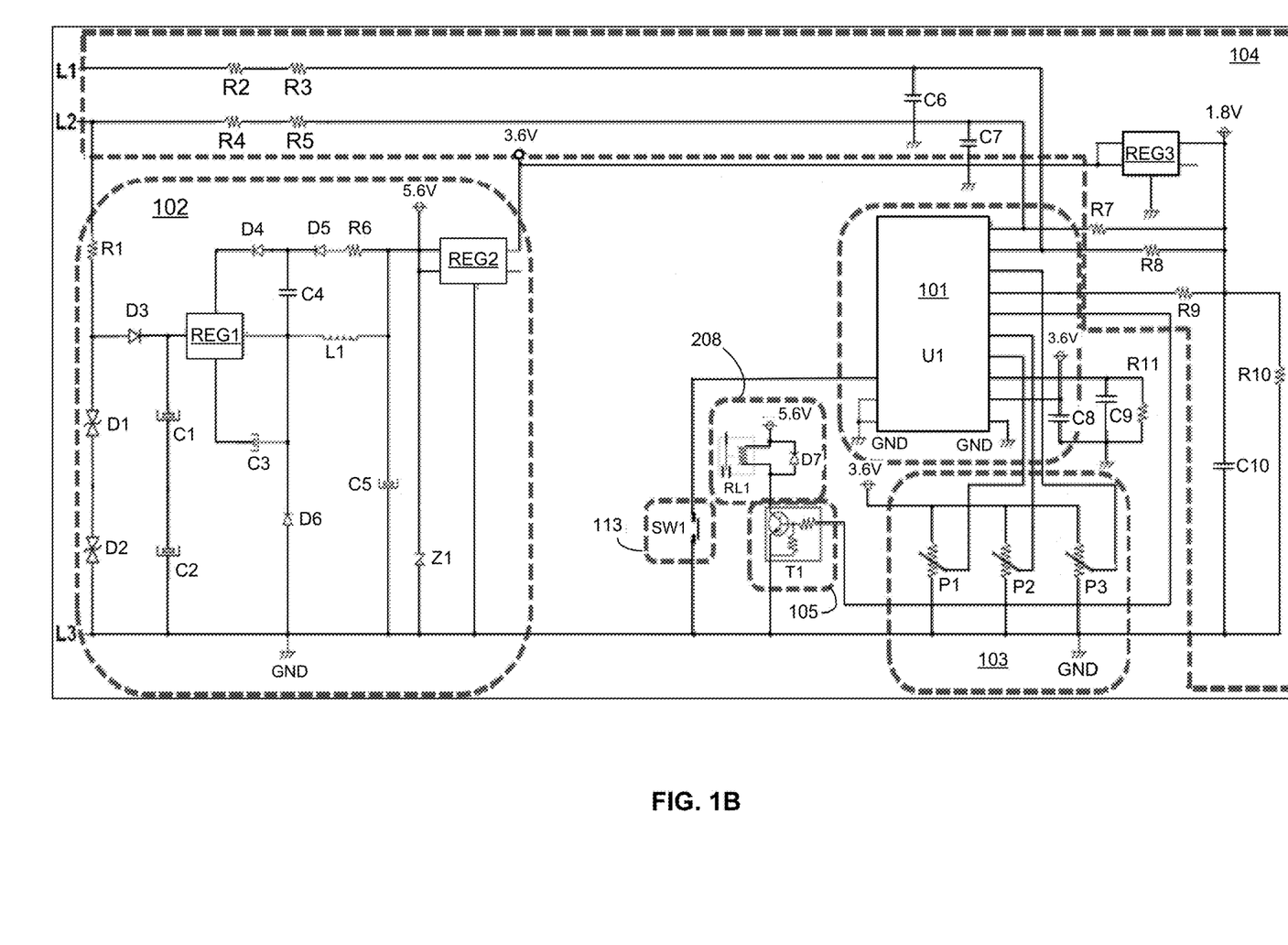
FIG. 1(b) shows a schematic circuit diagram illustrating the relay in the example embodiment.

FIG. 1(*b*) shows a schematic circuit diagram illustrating the relay 100 in the example embodiment.

In the example embodiment, the relay 100 comprises an input sampling module 104 coupled to a processing module 101. The processing module 101 is coupled to a setting module 103 that is in turn coupled to a user interface 108. The processing module 101 is further coupled to a trigger module 105 that can control a switch element 208 of the relay 100. The input sampling module 104 can couple to the source 110 using e.g. leads L1, L2, L3. A power supply module 102 is provided to supply power to the various components of the relay 100. The relay 100 may optionally comprise a storage module 107 coupled to the processing module 101 for storing detected values of one or more parameters of the source to be monitored. The relay 100 also comprises an output module 106 coupled to the processing module for communicating the detected values of one or more parameters of the source to be monitored to a user. An output port 111 coupled to the output module 106 to facilitate communication with a user may also be optionally present. The relay 100 may also be coupled to a programmable logic controller (not shown) for feedback.

In the example embodiment, the source indicated at numeral 110 is not limited to a three-phase voltage and can include various parameters for sources to be monitored such as single phase voltage, single phase current, temperature (from e.g. temperature sensors such as PT100, PTC, thermocouplers etc.), electrical signals associated with frequency characteristics, resistance (from e.g. resistor probes for liquid level sensing), and digital signals (from e.g. digital output sensors such as ultrasonic sensors, photo sensors, inductive sensors, pressure sensors etc.). Other parameters such as phase angle or power of a three-phase power supply may also be monitored. Accordingly, the relay 100 is not limited to monitoring power source parameters but may be adapted to monitor temperature, liquid level, speed, pressure, light, and other parameters that are suitable to be monitored.

The input sampling module 104 comprises a plurality of resistors e.g. R2, R3, R4, R5, R7, R8, R9, R10 and a linear voltage regulator REG3 which regulates voltage at about 1.8V. REG3 can be implemented as 1.8V Voltage Regulator LD2981ABM36TR from STMicroelectronics. Capacitors e.g. C6, C7, C10 are included for noise filtering purposes. The input sampling module 104 steps down and shifts a voltage level of the 3 phase voltage from numeral 110 to a voltage level suitable to be processed by the processing module 101. It will be appreciated that the sampling module 104 can have different circuit arrangements in order to adapt to various kinds of physical input parameters from different sources for monitoring at numeral 110.

The processing module 101 accepts inputs from the input sampling module 104 and conducts processing. The processing module 101 can comprise a microcontroller U1. U1 may be implemented using e.g. STM32F100C from STMicroelectronics or LPC1114 from NXP. Other components may be provided connected to the microcontroller as a supporting circuit to enable the microcontroller to function. It will be appreciated that the supporting circuit can vary depending on the type of microcontroller selected for implementation. In the example embodiment, the processing module 101 functions as an intelligent process element that interacts with the components within the relay 100. Processing in the processing module 101 is dependent on the firmware written.

The user interface 108 can comprise external manipulated elements to be accessed by a user of the relay 100. The manipulation or setting set by the user on the user interface 108 is sensed by the setting module 103 and is translated into an electrical signal at the setting module 103. The signal is transmitted to the processing module 101 for processing at the processing module 101.

There are various types of manipulation or settings depending on the type of relay 100. In this example, possible manipulation or setting can include voltage range selection setting, under-voltage setting, over-voltage setting etc. Asymmetry setting can be included as well. In an alternative example embodiment, for a relay 100 that is meant for monitoring frequency as a physical input type, possible manipulation or setting to be done by a user can include under-temperature setting, over-temperature setting etc. The settings set via the user interface 108 provide one or more threshold levels or "sets of conditions" that the relay 100 uses in order to determine whether the parameter values sampled at the source at numeral 110 fall within a working range based on these "sets of conditions".

In the example embodiment, the setting module 103 comprises a plurality of potentiometers P1, P2, P3 meant for converting the setting set by the user at the user interface 108 to an electrical signal that can be transmitted and recognized by the processing module 101. For example, P1 can translate a selection of nominal voltage range selected by the user (e.g. 200V, 220V, 380V, 400V, 440V, 480V); P2 can translate an over-voltage user setting; and P3 can translate an under-voltage user setting. It will be appreciated that the setting module 103 is not limited as such and can be expanded to more settings such as asymmetry, time setting etc.

In the example embodiment, the processing module 101 can set a working range based on applying the one or more threshold levels to a pre-set working condition, the threshold levels supplied via the setting module 103. If a monitored value of the parameter of the source to be monitored falls outside the working range, a trigger signal is transmitted. The trigger signal can be transmitted by the processing module 101 instructing the trigger module 105 to control the switch element 108. It will be appreciated that the working condition can be manually set or automatically set.

The trigger module 105 comprises a transistor T1 for driving or controlling the switch element 208. In the example embodiment, when T1 is turned ON, the switch element 208 is energized or switched on. When T1 is turned OFF, the switch element 208 is de-energized or switched off. It will be appreciated that there are various possibilities to modify the design and/or to reverse the above logic depending on designer preference.

In the example embodiment, the switch element 208 can be constructed as an electro-mechanical relay switch. The switch element 208 comprises a coil portion 204 and a contact portion 206. The coil portion 204 can be energized or de-energized by the trigger module 105 in order to switch the position or logic of the contact portion 206. It will be appreciated that the switch element can be any of electro-mechanical relay or solid-state switch.

In the example embodiment, the power supply module 102 functions as a power supply circuit of the relay 100. The power supply module 102 steps down and regulates an external power supply (see numeral 109) provided to the relay 100 to a voltage supply level that is suitable for the components in the relay 100. In the example embodiment, the power supply module 102 comprises a switching regulator integrated circuit REG1. REG1 can be implemented using e.g. a switching regulator NCP1052ST44T3G from ON Semi. The power supply module 102 also comprises a linear voltage regulator REG2 which regulates voltage at about 3.6V. REG2 may be implemented using e.g. a 3.6V voltage regulator LD2981ABM36TR from STMicroelectronics. Diodes D3, D6, an inductor L1, Zener diode Z1, and capacitors C5, C1, C2 provide a construction of a buck-converter. Diodes D4, D5, resistor R6, and capacitor C4 function as a feedback circuit for REG1, and functions to sample a regulated output voltage at about +5.6V in order to be able to achieve a voltage regulation purpose. A capacitor C3 is provided as a start-up element for REG1 when the power supply is initially provided to the relay 100. A resistor R1 and diodes D1, D2 function as a circuit for transient voltage protection.

With reference to FIG. 1(a), numeral 109 at leads L2, L3 denotes an external source of supply voltage for the relay 100. In this example, the source of supply voltage is the same physical input of the relay 100 (i.e. at leads L2, L3). However, it will be appreciated that it is not necessary that the source of supply voltage to be the same as the input to the relay 100.

The output module 106 can comprise a transceiver integrated circuit U2. U2 may be implemented using e.g. a Zigbee Transceiver CC2530 from Texas Instrument. The transceiver integrated circuit can transmit and receive information wirelessly or through a wired-medium to and from the relay 100, in communication with external devices such as a mobile phone, a computer, and/or a programmable logic controller. The transceiver integrated circuit can be, but not limited to, a Bluetooth transceiver, a WIFI transceiver, a Zigbee transceiver, a universal serial bus (USB) transceiver, a Serial Port transceiver, a Radio Frequency (RF) transceiver, a Bluetooth transceiver, infra-red transceiver. In cases, where two way communication between the user and the relay 100 is not required, the relevant transceiver may be replaced by a transmitter instead. Exemplary wireless protocols that may be utilized by the wireless transceiver/transmitter may include but are not limited to Bluetooth, Zigbee and wireless local area network (WLAN) etc.

As discussed above, an output port 111 may optionally be present to facilitate the communication of information between the relay 100 to the user. The output port 111 can be a physical port to receive information from other devices and channel this information to the output module 106 and vice-versa. The output port 111 can be an antenna U4 if the output module 106 comprises a wireless transceiver like Zigbee transceiver, Bluetooth transceiver etc. U4 can be implemented using e.g. an antenna MMZ1005S102ET from TDK Electronics. The output port 111 can be a Universal Serial Bus (USB) port when the output module 106 is a USB transceiver. The output port 111 can be a Registered Jack 45 (RJ45) port or other non-conventional connector port when the output module 106 comprises the corresponding transceivers. Other possible connector or communication ports include but are not limited to an IEEE 1384 port, a serial port, a parallel port, a Personal Computer Memory Card International Association (PCMCIA) port, an Inter-Integrated Circuit ($I^{2C}$) port, a Small Computer System Interface (SCSI) port, an optical port, a coaxial port, a Registered Jack 11 (RJ11) port, a RS232 port, a RS485 port, and a RS442 port.

As described, a storage module 107 can be optionally included in the relay 100. The storage module 107 can store all the instantaneous information of the 3 phase voltage, which includes instantaneous voltage level, historical voltage level, frequency, historical faults that has happened etc. In other embodiments, the storage module 107 may comprise a transient or permanent memory store. The memory store may be one selected from the group consisting of magnetic memory, an electronic memory, and an optical memory. Accordingly, the storage module may be a magnetic, optical or semiconductor type device. When the storage module is a semiconductor type device, the memory store may be selected from the group consisting of flash memory, read-only memory (ROM), magnetoresistive random access memory (MRAM), static random access memory (SRAM), synchronous dynamic random access memory (SDRAM), dynamic random access memory (DRAM) and rambus DRAM (RDRAM). Preferably, the storage module 107 takes the form of an external EEPROM, FLASH, or PROM integrated circuit. In other embodiments, the storage module 107 may also be embedded in the processing module 101. In this example embodiment, the storage module 107 is in the form of an EEPROM U3. U3 may be implemented using e.g. 24LC01B from Microchip.

Therefore, in the example embodiment, the relay 100 can function as a control & monitoring device for monitoring physical input parameters and to automatically determine the condition of the physical input parameters, i.e. whether the parameters are meeting one or more threshold levels set by a user. The relay 100 can reflect that status in terms of a digital form/feedback. This may be a trigger signal in terms of "closing a contact" or "opening a contact" if the switch element 208 is an electro-mechanical relay or in terms of "ON" or "OFF" if the switch element 208 is a solid-state switch. The relay 100 can be powered by a separate source of supply voltage or share the same source of supply voltage as the physical input parameters of the source to be monitored. In the example embodiment, the power source is preferably a three phase power source, although other kinds of power sources may also be used. It will be appreciated that the power source may be either an alternating current (AC) or direct current (DC) power.

Figure 2:
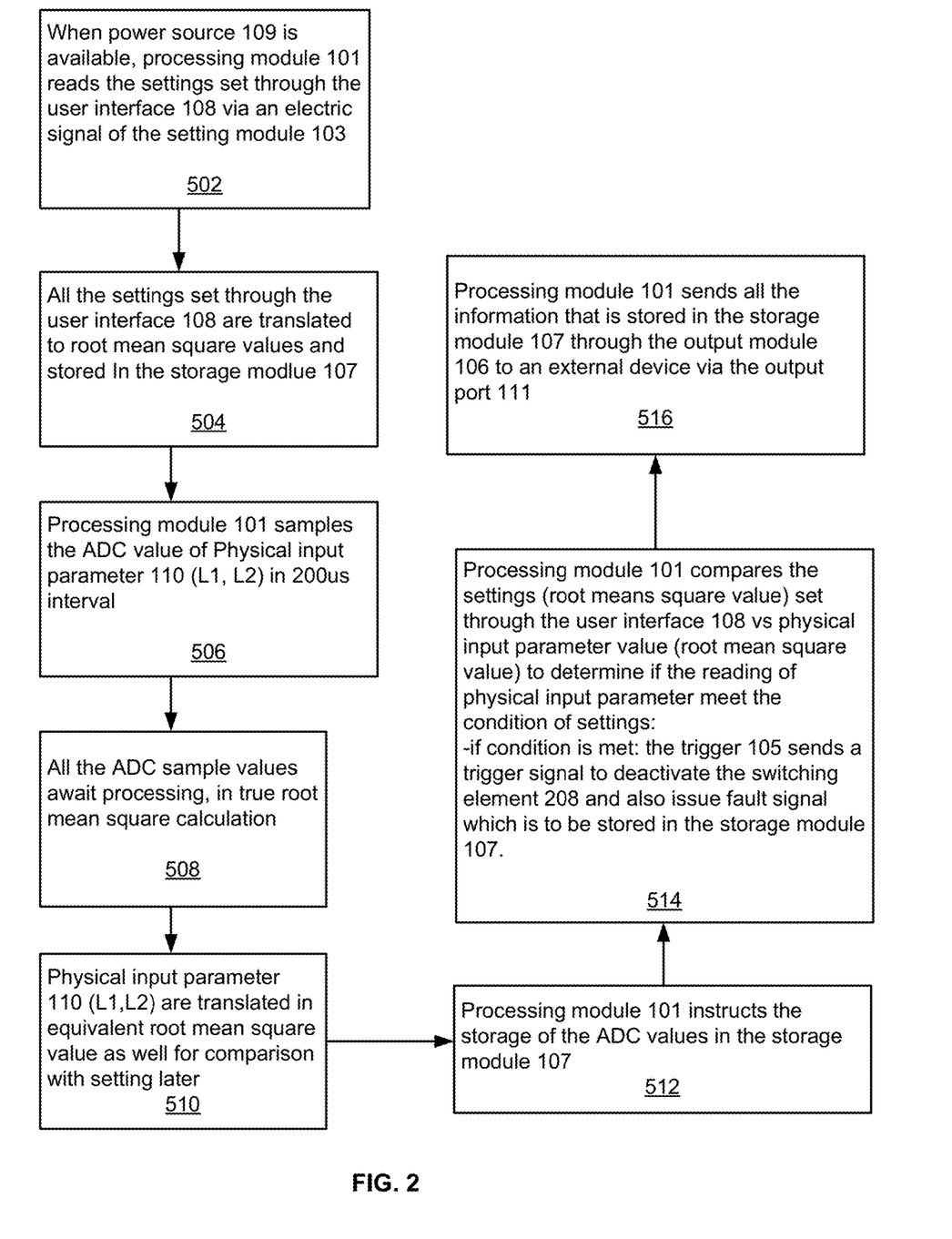
FIG. 2 shows a schematic flow diagram for broadly illustrating an algorithm of an exemplary firmware for the processing module of FIGS. 1(a) and 1(b) in an example embodiment.

FIG. 2 shows a schematic flow diagram for broadly illustrating an algorithm of an exemplary firmware for the processing module of FIGS. 1(a) and 1(b) in an example embodiment.

In step 502, in the presence of a power source 109, the processing module 101 reads the settings set through the user interface 108 via an electric signal of the setting module 103.

In step 504, all of the settings of set through the user interface 108 are translated to root mean square value and stored in the storage module 107.

Subsequently, in step 506, the processing module 101 samples the ADC (analog to digital converted) value of the physical input parameter of the source 110 via the leads L1 and L2 in 200 µs intervals. It will be appreciated that these intervals may be changed according to the designer's choice or through a setting by the user.

Next, in step 508, all of the ADC sampled values await processing, in true root mean square calculation by the processing module 101.

The actual processing is carried out in step 510, where the physical input parameters of source 110 obtained via leads L1 and L2 are translated in equivalent root mean square values as well for comparison with setting set through the user interface 108 later.

After the root mean square value of the physical input parameters of source 110 are obtained, the processing module 101 instructs the storage of the ADC values in the storage module 107, in step 512. In step 512, it should be noted that all instantaneous root mean square values of the physical input parameters are also stored in the storage module 107.

In step 514, the processing module 101 compares root mean square values of all of the settings of set through the user interface 108 with the root mean square values of the physical input parameters to determine if the physical input parameters meet the condition of set by the user. If the condition is met, the trigger module 105 is sent a trigger signal to deactivate the switching element 208 and also issue a fault signal which is to be stored in the storage module 107.

In step 516, the processing module 101 sends all the information that is stored in the storage module 107 through the output module 106 to an external device via the output port 111.

Figure 3:
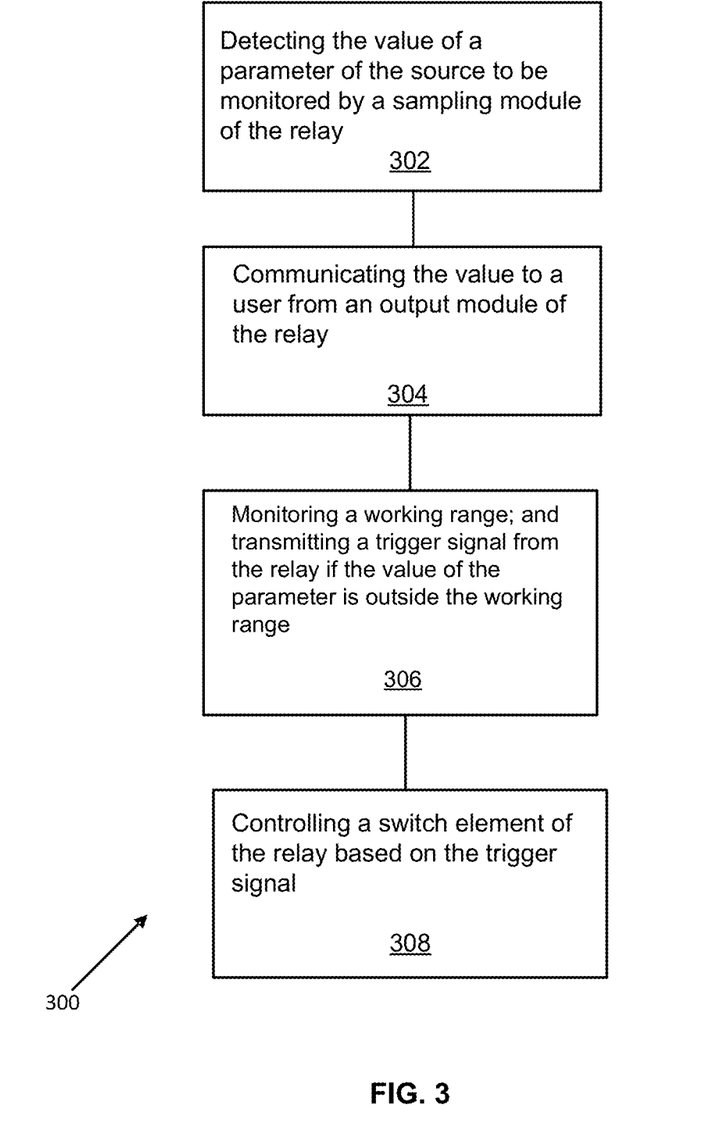
FIG. 3 shows a schematic flowchart illustrating a method 300 of communicating, from a relay, a value of a parameter of a source to be monitored in an example embodiment.

FIG. 3 shows a schematic flowchart illustrating a method 300 of communicating, from a relay, a value of a parameter of a source to be monitored in an example embodiment. At step 302, at least one value of a parameter of the source to be monitored by a sampling module of the relay is detected. Two or more values of at least one parameter of the source can be detected. Each value may correspond to one particular parameter. In such case, the number of values can correspond to the number of parameters detected. Alternatively, a plurality of values may correspond to one parameter and vice versa. At step 304, the value is communicated to a user from an output module of the relay. The relay may also be monitoring a working range and such that it transmits a trigger signal from the relay if the value of the parameter is outside the working range, as shown in step 306. In such situation, a switch element of the relay is controlled to be in the on or off state, based on the trigger signal, as shown in step 308.

Figure 4:
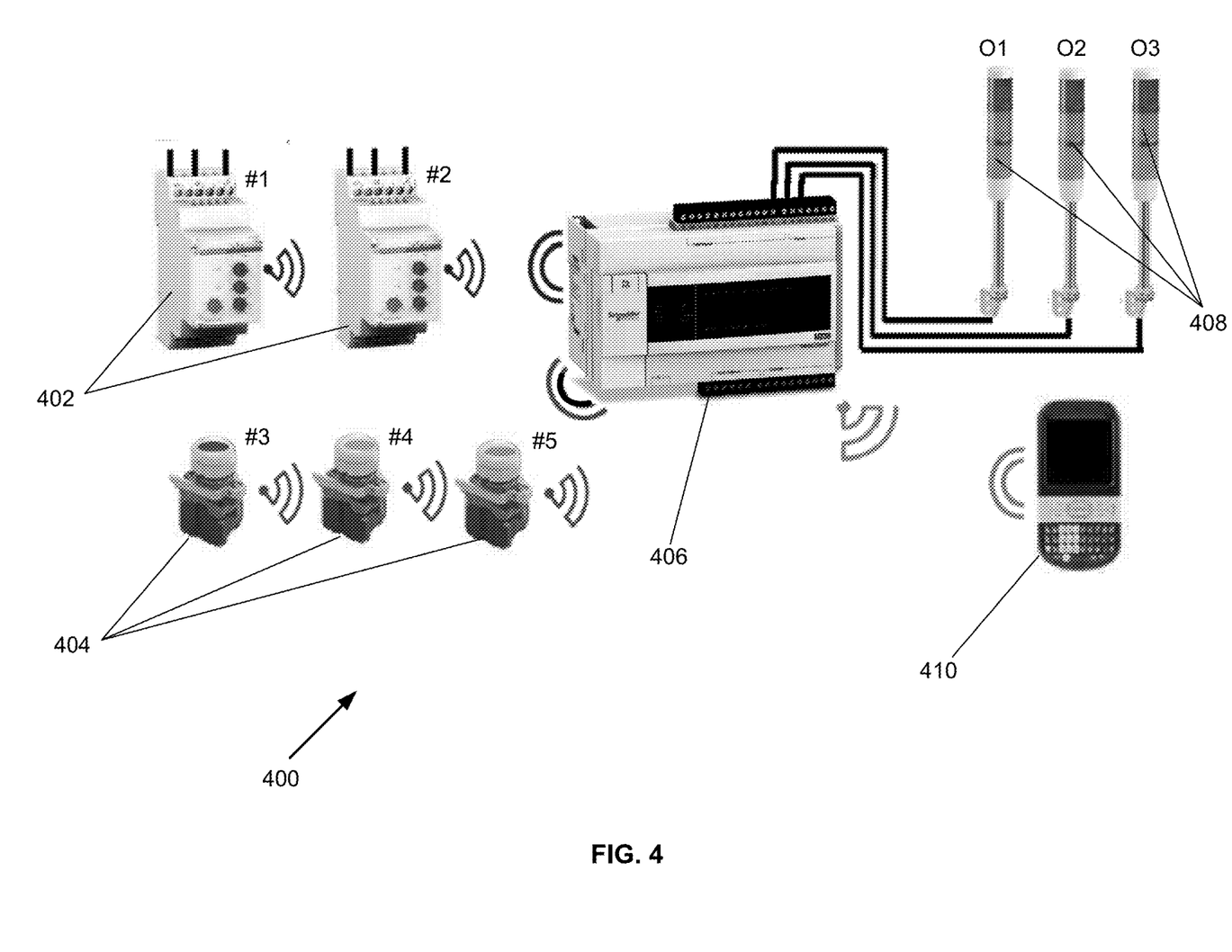
FIG. 4 shows a notification system comprising two relays, three wireless push buttons, a programmable logic controller and a mobile phone in an example embodiment.

FIG. 4 shows a notification system 400 comprising two relays 402, three wireless push buttons 404, a programmable logic controller 406 and a mobile phone 410 in an example embodiment. In use, the relays 402 detect and produce information regarding fault conditions relating to the power source. As previously mentioned, it will be appreciated that the notification system is not limited to monitoring power source parameters but may be adapted to monitor temperature, liquid level, speed, pressure, light, and other parameters that are suitable to be monitored. These information are transmitted to the programmable logic controller 406 wirelessly. The wireless transmission may be directly from the relays 402 to the programmable logic controller 406 or indirectly via the wireless push buttons 404. Once the programmable logic controller 406 receives the fault information, it sends a signal to light up the appropriate tower lights 408. Each tower light corresponds to a particular fault condition and the lighting up of each tower light represents the presence of that particular fault condition in the power supply. At the same time, the programmable logic controller 406 may also send the fault information to the user's mobile phone 410 for example via short message service (SMS) to alert the user of the fault condition(s). In certain embodiments, the notification system is not limited to only notifying the user when a fault condition arises, the programmable logic controller 406 is also able to send periodic or real time continuous updates on the power source conditions to the user's mobile phone. In certain embodiments, the settings in the relays 402 can be overwritten by the signals transmitted from the programmable logic controller 406 and the mobile phone 410. In this regard, the user may apply settings to the relays 402 via the wireless communication.

Figure 5A:
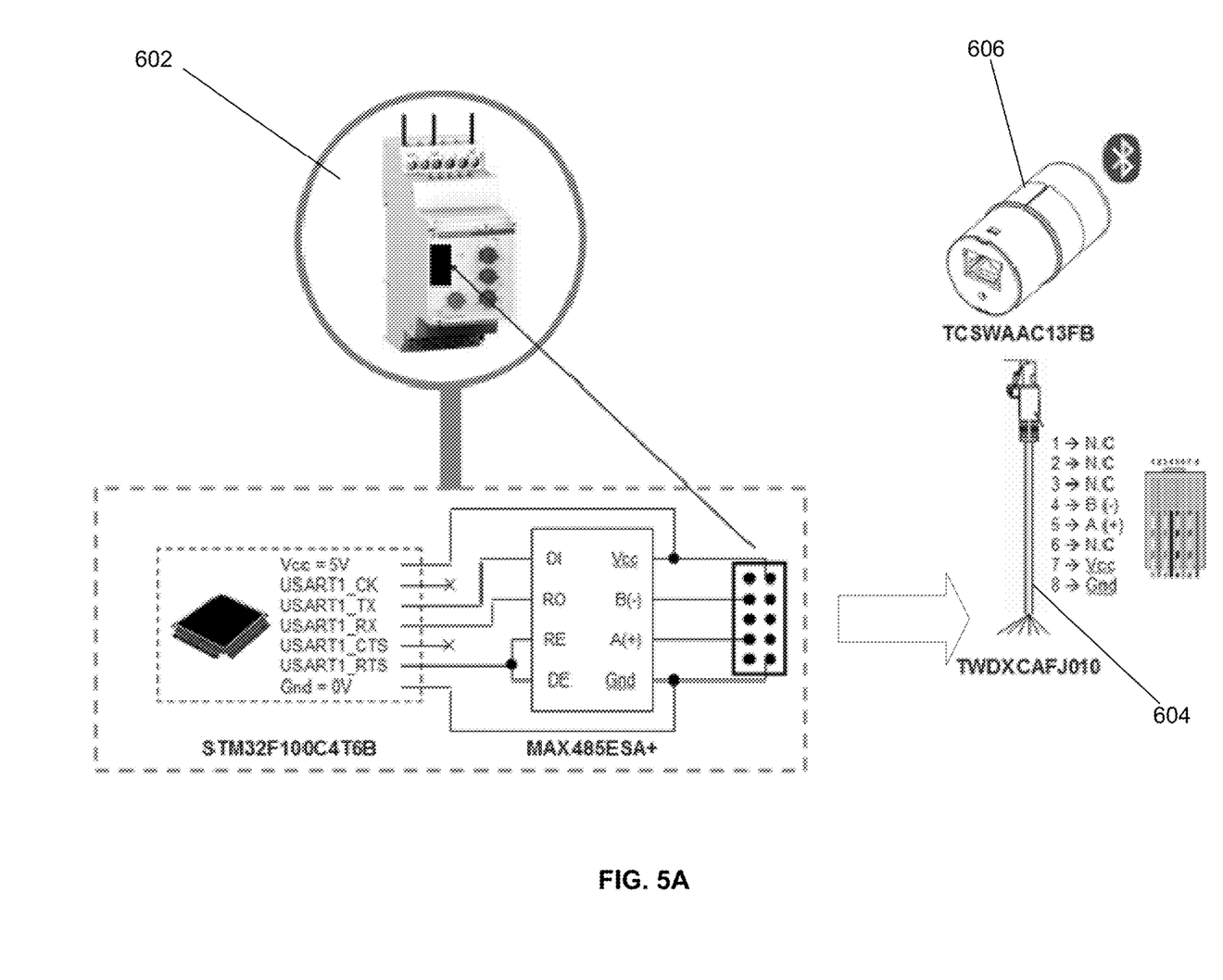
FIG. 5(a) shows an electronics control relay having Bluetooth communication capabilities in an example embodiment.
Figure 5B:
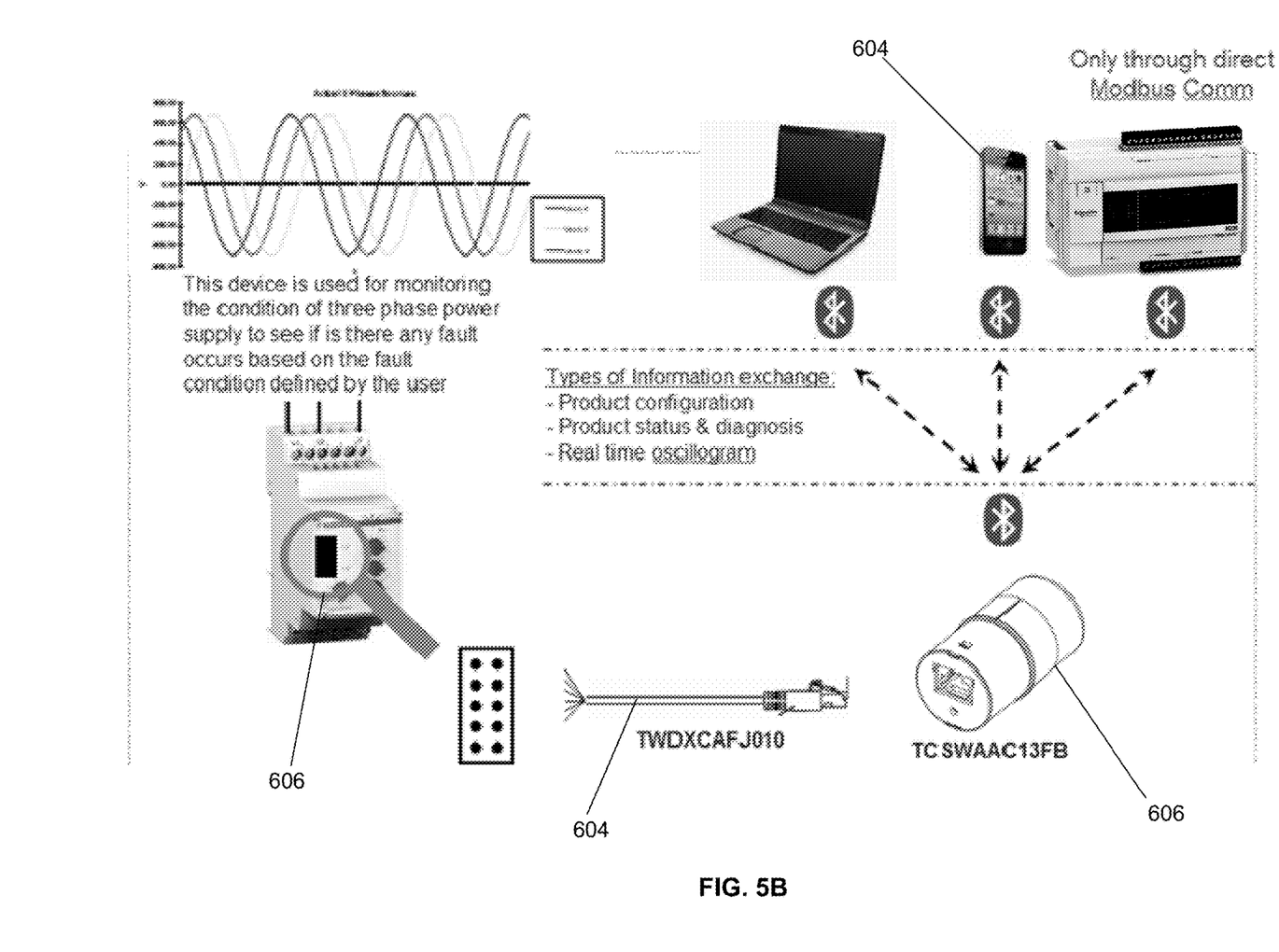
FIG. 5(b) shows an example implementation of the electronics control relay of FIG. 5(a) where the relay communicates with other Bluetooth enabled devices.

FIG. 5(a) shows an electronics control relay 602 having Bluetooth communication capabilities in an example embodiment. A RS485 interface is added to the electronics control relay 602 using a MODBUS protocol. The electronics control relay 602 can be implemented using e.g. the electronics control relay part no. EN60255-6. The electronics control relay 602 is connected to a Bluetooth transceiver 606 via a coupling member 604. The Bluetooth transceiver 602 can be implemented using a Bluetooth Transceiver part no. TCSWAAC13FB and the coupling member 604 can be implemented using the coupling member part no. TWDXCAF0J10. In such setup, the electronics control relay is able to exchange information with any other devices with Bluetooth technology FIG. 5(b) is an example implementation of the electronics control relay of FIG. 5(a) where the relay communicates with other Bluetooth enabled devices 608. When the Bluetooth enabled devices 608 s equipped with a compatible application, the information that is able to be exchanged between the electronics control relay 606 and the Bluetooth enabled devices 608 includes (a) Historical/Real time input data of the product, (b) Historical/Real time output data of the product, (c) Historical/Real time actual product setting (due to tolerance) as compared to user setting, (d) Historical/Real time status (type of fault), (e) Storage of manufacturing information (quality information of each process).

Figure 6:
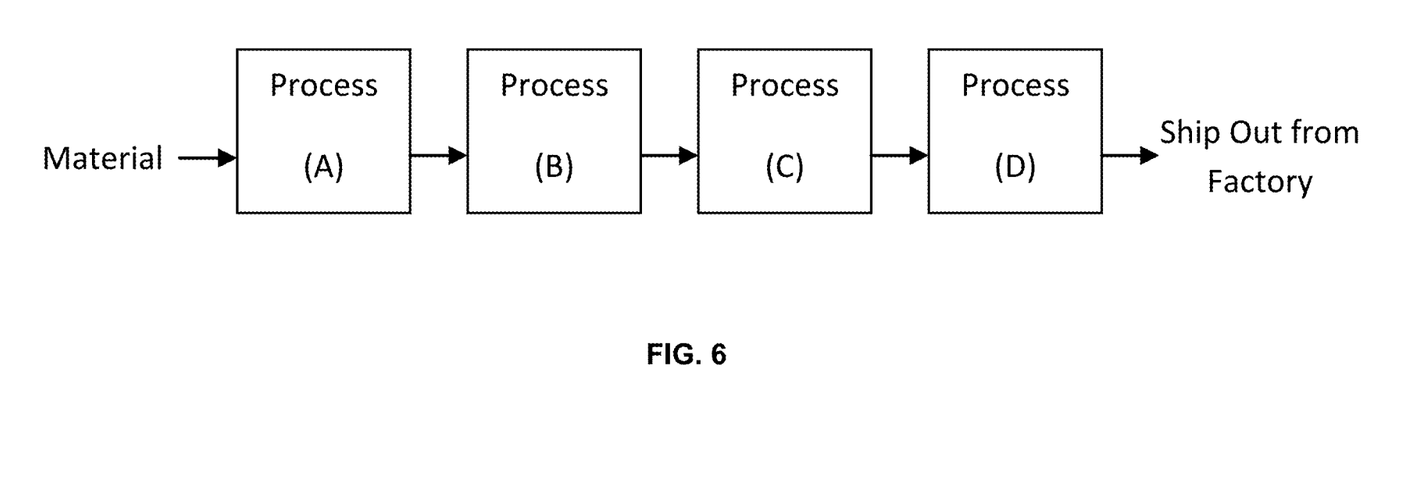
FIG. 6 shows an example of a manufacturing process line for one embodiment of the relay disclosed herein.

FIG. 6 is an example of a manufacturing process line for one embodiment of the relay disclosed herein. All quality information from e.g. Process (A) to (D) are stored in each of the products ship out from factory. These quality information may be retrieved through special settings & procedures carried out on the relays by the manufacturers. These information can be retrieved especially for customer return analysis to help in problem diagnosis. These information can also be used for statistical analysis to prevent drift of quality Applications The above described example embodiments can advantageously provide information relating to conditions of the power supply. This can provide early warning to users on an impending fault. As such, this can also avoid or reduce unnecessary downtime of the equipment connected and controlled by energisable device. The information can also help to ensure that machines or equipment utilising the energisable element are working at their optimum conditions. Maintenance and diagnosis work can thus be made simpler and cheaper. Furthermore, in embodiments where the communication of the information is done wirelessly, users can keep track of the status of the power supply remotely, without having to be physically present on-site.

From a user's perspective, the following advantages may be achieved in some embodiments. The user is able to read critical information from the relay through: (i) Real time input data of the relay; (ii) Real time output data of the relay; (iii) Real time actual relay setting (due to tolerance) as compared to user setting; (iv) Real time status (type of fault). During a maintenance check, the user can put in place preventive measures when necessary based on the critical information read from the above. For example, when the data shows that the input of the relay is tending towards the triggering point (i.e. the relay trip), the user may check on the system in advance to unnecessary prevent system down From a manufacturer's perspective in terms of manufacturing, the following advantages may be achieved in some embodiments. The relay may be able to store/record all the manufacturing information for each of individual relays in each processing step during manufacturing that are produced in order to: (i) To ensure each of the relays produced are fully compliant with the quality procedures defined; (ii) To help in statistical analysis of manufacturing process and design parameters of the relays. In other words, all quality information from e.g. Process (A) to (D) (see FIG. 6) are stored in each of the products ship out from factory. These quality information may be retrieved through special settings & procedures carried out on the relays by the manufacturers. These information can be retrieved especially for customer return analysis to help in problem diagnosis. These information can also be used for statistical analysis to prevent drift of quality From a manufacturer's perspective in terms of support to the user, the following advantages may be achieved in some embodiments. The manufacturer is able to understand the user's application in terms of the set parameters, environment parameters, input parameters & output parameters in order: (i) To diagnose the root causes of the incompatibility of the relays in the user's specific application; (ii) To diagnose the root causes of the damages of relays in user's application if necessary; (iii) To propose solution to user from the above diagnosis.

It will be understood, however, that the present invention may be practiced without necessarily providing one or more of the advantages described herein or otherwise understood in view of the disclosure and/or that may be realized in some embodiments thereof. It will be appreciated by a person skilled in the art that other variations and/or modifications may be made to the specific embodiments without departing from the spirit or scope of the invention as broadly described. The present embodiments are, therefore, to be considered in all respects to be illustrative and not restrictive. The present embodiments are, therefore, to be considered in all respects as illustrative and not restrictive of the present invention, which should be defined in accordance with the claims that follow.

The invention claimed is:

1. A relay comprising:
   an input sampling module configured to couple to a source to be monitored and configured to detect a plurality of values of a plurality of parameters of the source to be monitored;
   a user interface configured to receive user inputs to set a setting signal for each of the plurality of parameters;
   an output module configured to communicate the values of the parameters to a user;

a processing module configured to monitor a working range for each of the plurality of parameters, wherein the working range for each parameter is based on the corresponding setting signal, wherein the processing module is configured to instruct a trigger module to transmit a trigger signal for energizing or de-energizing a switch element of the relay if the value of the at least one parameter is determined by the processing module to be outside the working range; and a storage module coupled to the processing module and configured to store (i) the setting signal for each of the parameters, and (ii) the values detected for the plurality of parameters, including the detected value of the parameter determined by the processing module to be outside the working range, wherein the storage module comprises a permanent memory store; and wherein, in the event that the at least one parameter is determined by the processing module to be outside the working range, the processing module is further configured to communicate via the output module information that is stored in said storage module, including (i) the setting signal for each of the parameters, and (ii) the values detected for the plurality of parameters, including the detected value of the parameter determined by the processing module to be outside the working range.

2. The relay as claimed in claim 1, wherein the storage module coupled to the processing module is configured to store a fault signal issued by the processing module if the value of the parameter is determined by the processing module to be outside the working range.

3. The relay as claimed in claim 1, wherein the relay comprises the trigger module coupled to the processing module for controlling the switch element based on the trigger signal.

4. The relay as claimed in claim 3, wherein the switch element includes at least one of a electromechanical relay switch or a solid state relay switch.

5. The relay as claimed in claim 1, wherein the parameters are selected from a group consisting of three phase voltage, single phase voltage, single phase current, phase angle, phase frequency, power, temperature, resistance, and digital signals.

6. The relay as claimed in claim 1, wherein the relay further comprises an output port coupled to the output module for facilitating the communication of said values.

7. The relay as claimed in claim 6, wherein the output port is configured to receive a compatible plug in.

8. The relay as claimed in claim 7, wherein the outlet port includes at least one port selected from the group consisting of a Universal Serial Bus (USB) port, a Registered Jack 45 (RJ45) port, an IEEE 1384 port, a serial port, a parallel port, a Personal Computer Memory Card International Association (PCMCIA) port, an Inter-Integrated Circuit (I2C) port, a Small Computer System Interface (SCSI) port, an optical port, a coaxial port, a Registered Jack 11 (RJ11) port, a RS232 port, a RS485 port, and a RS442 port.

9. The relay as claimed in claim 1, wherein the output module comprises a wireless transceiver.

10. The relay as claimed in claim 9, wherein the wireless transmitter is selected from the group consisting of a Bluetooth transceiver, a WIFI transceiver, a Zigbee transceiver, a Radio Frequency (RF) transceiver, a Bluetooth transceiver, and an infra-red transceiver.

11. The relay as claimed in claim 10, wherein the wireless transceiver uses a wireless protocol selected from the group consisting of Bluetooth, Zigbee and WLAN protocol.

12. The relay device as claimed in claim 1, wherein the output module comprises a display capable of communicating the value directly to the user.

13. A communicating method of a relay, the method comprising:
   detecting a plurality of values of a plurality of parameters of a source to be monitored by a sampling module of the relay;
   receiving, via a user interface of the relay, user inputs to set a setting signal for each of the plurality of parameters
   communicating the values of the parameters to a user from an output module of the relay;
   monitoring a working range for each of the plurality of parameters, wherein the working range for each parameter is based on the corresponding setting signal;
   transmitting a trigger signal for energizing or de-energizing a switch element of the relay if the value of at least one of the parameters is outside a working range;
   storing, in a permanent memory store of a storage module of the relay, (i) the setting signal for each of the parameters, and (ii) the values detected for the plurality of parameters, including the value of the parameter outside the working range; and
   in the event that the at least one parameter is outside the working range, communicating via the output module information that is stored in said permanent memory store, including (i) the setting signal for each of the parameters, and (ii) the values detected for the plurality of parameters, including the detected value of the parameter determined by the processing module to be outside the working range.

14. The method as claimed in claim 13, further comprising storing a fault signal in the permanent memory if the value of the parameter is outside the working range.

15. The method as claimed in claim 13, further comprising controlling the switch element of the relay to energize or de-energize the switch element based on the trigger signal.

16. The method as claimed in claim 15, wherein the switch element includes at least one of an electromechanical relay switch or a solid state relay switch.

17. The method as claimed in claim 13, wherein the parameters includes at least one parameter selected from a group consisting of three phase voltage, single phase voltage, single phase current, phase angle, phase frequency, power, temperature, resistance, and digital signals.

18. The method as claimed in claim 13, wherein the step of communicating the value comprises utilizing at least one cable selected form thegroup consisting of a Universal Serial Bus (USB) cable, a Registered Jack 45 (RJ45) cable, an IEEE 1384 cable, a serial cable, a parallel cable, a Personal Computer Memory Card International Association (PCMCIA) cable, an Inter-Integrated Circuit (I2C) cable, a Small Computer System Interface (SCSI) cable, an optical cable, a coaxial cable, a Registered Jack 11 (RJ11) cable, a RS232 cable, a RS485 cable, and a RS442 cable.

19. The method as claimed in claim 18, further comprising: utilizing at least one of a computer or mobile phone.

20. The method as claimed in claim 13, wherein said communicating the value comprises utilizing a wireless protocol.

21. The method as claimed in claim 20, wherein the wireless protocol includes at least one selected from the group consisting of Bluetooth, Zigbee, and WLAN protocol.

22. A system comprising:
a relay comprising:
 an input sampling module configured to couple to a source to be monitored and configured to detect a plurality of values of a plurality of parameters of the source;
 a user interface configured to receive user inputs to set a setting signal for each of the plurality of parameters;
 an output module configured to communicate the values of the parameters to a user; and
 a processing module configured to monitor a working range for each of the plurality of parameters, wherein the working range for each parameter is based on the corresponding setting signal, wherein the processing module is configured to instruct a trigger module to transmit a trigger signal for energizing or de-energizing a switch element of the relay if the value of the at least one parameter is determined by the processing module to be outside the working range; and
 a storage module coupled to the processing module and configured to store (i) the setting signal for each of the parameters, and (ii) the values detected for the plurality of parameters, including the detected value of the parameter determined by the processing module to be outside the working range, wherein the storage module comprises a permanent memory store; and
 wherein, in the event that the at least one parameter is determined by the processing module to be outside the working range, the processing module is further configured to communicate via the output module information that is stored in said storage module, including (i) the setting signal for each of the parameters, and (ii) the values detected for the plurality of parameters, including the detected value of the parameter determined by the processing module to be outside the working range; and
 a notification device coupled to the output module of the relay and configured to receive the value, wherein the notification device is configured to alert the user.

23. The notification system as claimed in claim 22, wherein the notification device comprises a programmable logic controller.

24. A non-transitory computer readable data storage medium having stored thereon computer code for instructing a processing module of a relay to execute a communicating method of a relay, the method comprising:
 detecting a plurality of values of a plurality of parameters of a source to be monitored by a sampling module of the relay;
 receiving, via a user interface of the relay, user inputs to set a setting signal for each of the plurality of parameters
 communicating the values of the parameters to a user from an output module of the relay;
 monitoring a working range for each of the plurality of parameters, wherein the working range for each parameter is based on the corresponding setting signal;
 transmitting a trigger signal for energizing or de-energizing a switch element of the relay if the value of at least one of the parameters is outside a working range;
 storing, in a permanent memory store of a storage module of the relay, (i) the setting signal for each of the parameters, and (ii) the values detected for the plurality of parameters, including the value of the parameter outside the working range; and
 in the event that the at least one parameter is outside the working range, communicating via the output module information that is stored in said permanent memory store, including (i) the setting signal for each of the parameters, and (ii) the values detected for the plurality of parameters, including the detected value of the parameter determined by the processing module to be outside the working range.

* * * * *